United States Patent [19]
Brown

[11] 3,833,119
[45] Sept. 3, 1974

[54] GRADING APPARATUS
[76] Inventor: Robert B. Brown, Rt. 1, Valley Head, Ala. 35989
[22] Filed: June 25, 1973
[21] Appl. No.: 373,450

[52] U.S. Cl. ................................... 209/99, 119/3
[51] Int. Cl. ........................................... B07b 13/04
[58] Field of Search .................. 209/99, 82; 119/3

[56] References Cited
UNITED STATES PATENTS
1,491,802  4/1924  Irwin .................................... 209/99
3,204,605  9/1965  Vroman ........................... 209/99 X Primary Examiner—M. Henson Wood, Jr.
Assistant Examiner—Gene A. Church
Attorney, Agent, or Firm—Lamont Johnston

[57] ABSTRACT

A grading device for grading various objects including live fish according to size has a frame having a multiplicity of elements spaced apart therein and defining a multiplicity of passages in the frame. Superimposed outside tubes or sleeves are insertable into the frame over these elements to change the size of these passages without having to remove the frame from operative use. Also claimed is a fish growing crate consisting of four juxtaposed devices of this type.

7 Claims, 3 Drawing Figures

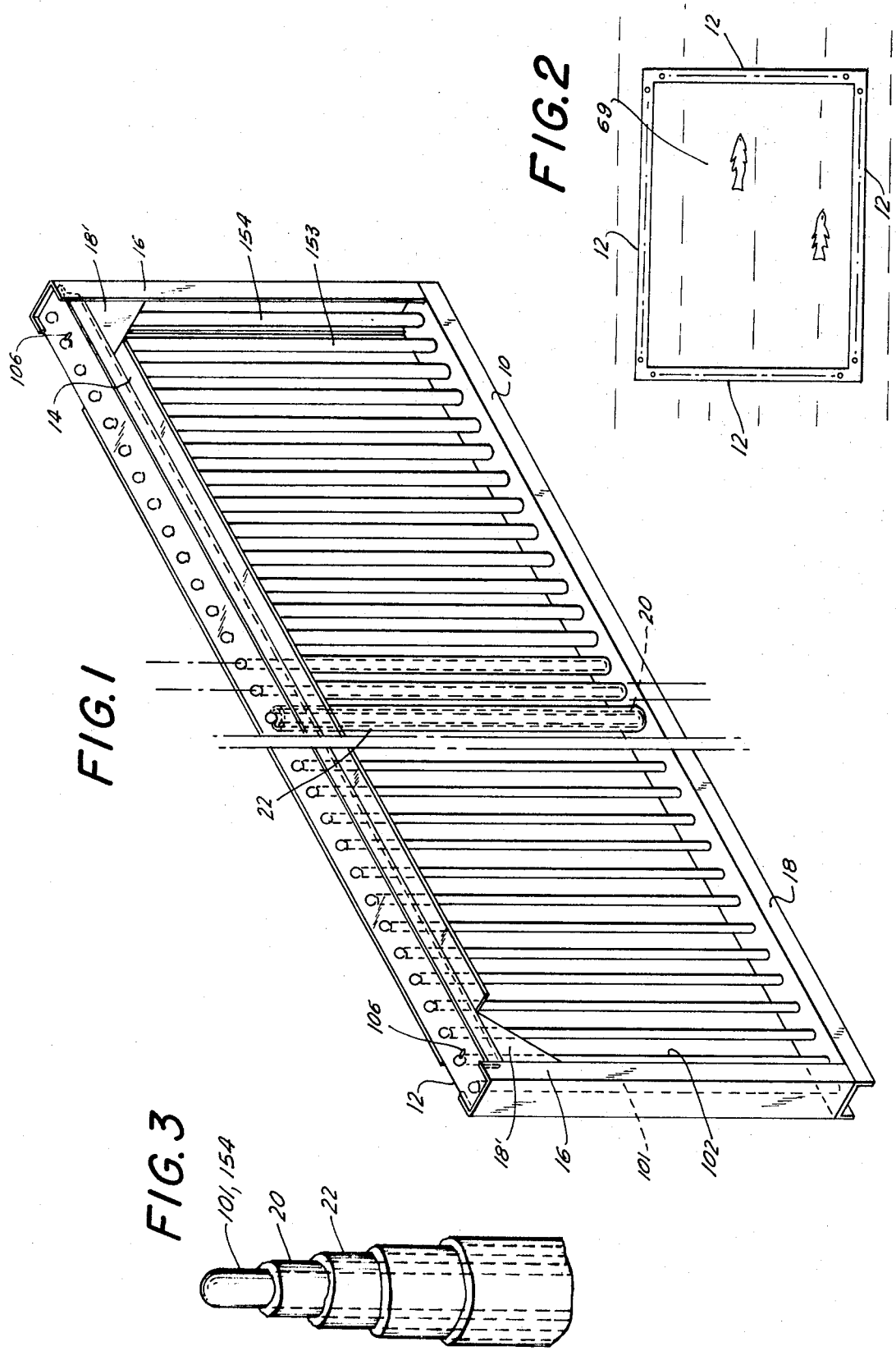

GRADING APPARATUS

The present invention relates to new and useful apparatus for sorting objects, in particular live fish to separate same according to size.

Generally grading apparatus of this type do not have means for easily determining or changing the sizes of the objects they group. Such apparatus usually are positioned in spaced relation and each have successively smaller sorting openings.

The main object of this invention is to provide grading apparatus having variable size passages therethrough.

The apparatus of the invention will be described in relation to grading apparatus useful for sorting and holding live fish in raceways or ponds. The invention will be described also in terms of a fish growing crate composed of four juxtaposed screens for confining fish in a body of water.

The present invention will be more fully understood as the description thereof proceeds together with the accompanying drawing wherein:

FIG. 1 is a perspective view of a sorting unit according to the present invention;

FIG. 2 is a top plan view of a fish growing crate made with four units, according to FIG. 1; and FIG. 3 is a perspective view showing the relationship of a plurality of sleeves for use with the sorting unit of FIG. 1.

Referring to FIG. 1, the same shows a fish grading unit having a frame 10 which can be 2 inches thick, 2 ½ feet high and 6 feet long. Actually, this frame can be made in any size to fit different key ways. Frame 10 is formed of rods 101 to 154 which can be ½ inch diameter, 2 ½ feet long. Rods 102 and 153 have an opening at their upper end for the passage of fastening means 106 after the top of frame is mounted. The top of the frame consists of a channel member 12 which measures 1" × 2" × ⅛" holes in the center spaced 1 ⅛ inch apart. Secured by spring clips or otherwise to the outside of skirt or depending part of member 12 is angle iron 14 which in this example measures 1" × 1" × ⅛". The sides of the frame consist of channel members 16 welded to bottom member 18 which is identical to top member 12. The ends of side members 14 fit within members 16. Channel members 16 measure 1" × 2" × ⅛" × 2' 4". Braces 18' are welded at the upper part of the frame to side members 16 and to member 14. These braces measure 3" × 3" × ⅛. Spring clip fasteners 106 hold top member 12 and pass through the respective openings at the top of rods 102 and 153. Reading the drawing left to right, these are the second and next-to-last rods. All the rods are welded at their bottom to the bottom member 18. It will be noted that the space between each adjoining rod defines a vertical passageway with the naked rods in position. The width of the passageway can be, for example 1 ⅛ inch. To change this width, a metal or plastic sleeve 20 (one-half inch ID, one-eighth inch thick) is put on every odd rod after removing fasteners 106 and top 12. This cuts down the opening between such rods to, say, 1 inch, then sleeve 20 can be put on every even numbered rod to give a ⅞ inch opening. Then a second sleeve 22 having a ¾ inch inside diameter, 2 feet 5 inches long and ⅛ inch thick is slipped over sleeve 20 on every other rod to further reduce the openings to 6/8 inches. Placing a sleeve 22 over the other sleeves 20 will result in a ⅝ inch opening. Naturally, the sizes of the opening can be regulated as needed by varying the number of sleeves and their thickness.

All the user has to do is either put pipes on metal rods to reduce openings or take pipes off to increase openings. If you have several different sizes of fish in lower raceway, you set the openings in the screen so the smallest fish can swim upstream through openings in screen, crowd fish against the screen, let little fish swim through to upper raceway and then add another pipe to hold them there so they will not swim back downstream. You can then grade the next size.

Once all the fish are graded and in the right raceway according to size, as fish grow larger, you can remove pipes to make openings larger so that water and trash can pass through the screen without clogging it. This screen will stay cleaner and be easier to clean because all the openings are vertical with no obstruction by horizontal objects as is common in wire or hardware cloth.

By using wider spacings between vertical rods, this device can be used to grade potatoes, apples, oranges and other fruits and vegetables.

The present device can be used on combines to screen different kinds of grain.

By using metal sleeves instead of plastic, this grading screen can be used on rock crushers to screen different sizes of rock. An important advantage is that if one or two of the outside sleeves get damaged or worn, they can be slipped off and replaced with a new sleeve in a matter of a few seconds without having to replace the whole screen, and the size of the openings can be changed without removing the screen from the machine. The present device can also be used to grade coal, sand, gravel, wood chips and the like. For some applications it will be obvious that the grading device should be positioned horizontally or at an appropriate angle.

The present device can be used in spillways of lakes, on water intakes, at steam plants and nuclear plants to screen fish and debris out of the water. Easy cleaning of the device would be an advantage.

FIG. 2 shows how four of the units shown in FIG. 1 can be secured together in box shape with a bottom 69 and a top (not shown) to form a live fish growing crate.

The advantage of this construction is that as fish grow larger, sleeves around the rods can be removed easily thereby making the openings between the rods wider resulting in greater water circulation and letting more natural food in for the fish confined in the crate.

I claim:

1. A unit for sorting objects such as fish or the like according to size comprising a frame having a fixed bottom member, side members fixed to said bottom member, and a removable top supported by said side members; a plurality of spaced members fixed at one end to said bottom member and disposed substantially parallel to each other to form passages therebetween; each of said spaced members having a round outer surface throughout its length and being of the same diameter throughout its length; each of said spaced members being disposed the same distance from the adjacent of said spaced members to cause the width of each of said passages to be the same; said top having openings therein to receive the other end of each of said spaced members; fastening means to removably secure said top to at least some of said spaced members; and sleeve members adapted to slip concentrically over each of said spaced members to reduce the width of each of said passages while maintaining the width of each of said passages substantially the same, each of said sleeve members having a round outer surface.

2. The unit according to claim 1 in which a plurality of interfitting sleeve members can be disposed on each of said spaced members to reduce the width of each of said passages while maintaining the width of each of said passages substantially the same.

3. The unit according to claim 2 in which some of said spaced members have openings at their other ends to receive said fastening means.

4. The unit according to claim 3 in which said fastening means consist of spring clips.

5. The unit according to claim 1 in which some of said spaced members have openings at their other ends to receive said fastening means.

6. The unit according to claim 5 in which said fastening means consist of spring clips.

7. A live fish growing crate comprising a box-shaped structure including a top and a bottom and sides formed of four units as defined in claim 1.

* * * * *